United States Patent
Placke et al.

(10) Patent No.: US 8,301,317 B2
(45) Date of Patent: Oct. 30, 2012

(54) DRIVER INFORMATION DEVICE

(75) Inventors: Lars Placke, Hannover (DE); Michael Dorna, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 11/922,993

(22) PCT Filed: May 17, 2006

(86) PCT No.: PCT/EP2006/062364
§ 371 (c)(1),
(2), (4) Date: Feb. 3, 2009

(87) PCT Pub. No.: WO2007/000376
PCT Pub. Date: Jan. 4, 2007

(65) Prior Publication Data
US 2009/0216389 A1    Aug. 27, 2009

(30) Foreign Application Priority Data
Jun. 29, 2005 (DE) .......................... 10 2005 030 213

(51) Int. Cl.
*G05D 1/00* (2006.01)
*G05D 3/00* (2006.01)
*G05F 7/00* (2006.01)
*G06F 17/00* (2006.01)

(52) U.S. Cl. ........................................................ 701/1
(58) Field of Classification Search ................... 701/29, 701/1, 200, 36, 30; 340/901, 905, 425.5
See application file for complete search history.

(56) References Cited

U.S. PATENT DOCUMENTS

| | | | |
|---|---|---|---|
| 5,089,826 A | | 2/1992 | Yano et al. |
| 5,133,081 A | * | 7/1992 | Mayo ............................... 455/18 |
| 6,389,332 B1 | * | 5/2002 | Hess et al. ........................ 701/1 |
| 6,434,450 B1 | | 8/2002 | Griffin, Jr. et al. |
| 7,277,780 B2 | * | 10/2007 | Meier-Arendt et al. ........... 701/1 |
| 2004/0204157 A1 | | 10/2004 | Remboski et al. |
| 2005/0096808 A1 | * | 5/2005 | Meier-Arendt et al. ......... 701/29 |
| 2005/0143884 A1 | * | 6/2005 | Bihler et al. .................... 701/36 |
| 2008/0243326 A1 | * | 10/2008 | Dobler et al. ................... 701/29 |
| 2009/0216389 A1 | * | 8/2009 | Placke et al. ...................... 701/1 |

FOREIGN PATENT DOCUMENTS

| | | |
|---|---|---|
| DE | 196 38 703 | 4/1998 |
| DE | 199 61 871 | 7/2001 |
| EP | 1508476 | 2/2005 |
| JP | 8-240444 | 9/1996 |
| WO | WO 2005/022481 | 3/2005 |

* cited by examiner

*Primary Examiner* — Mary Cheung
*Assistant Examiner* — Michael D Lang
(74) *Attorney, Agent, or Firm* — Kenyon & Kenyon LLP

(57) ABSTRACT

A driver information device includes an output unit for outputting items of driver information, a pause having a predetermined length being inserted between the outputting of a first and a second item of information.

8 Claims, 2 Drawing Sheets

DRIVER INFORMATION DEVICE

BACKGROUND INFORMATION

Driver information devices are known that can be used to output many items of information to the driver. These items of information can relate on the one hand to a driving situation itself, or to instructions to the driver, but also to other kinds of information, e.g. an incoming telephone call. This information may be outputted to the driver at a time at which the information will disturb the driver.

German Patent Application No. DE 197 23 922 describes a signal display device for indicating a system state in a motor vehicle. The signal display device has a logic circuit that uses a signal to activate a delay unit when a stressful driving situation is present and/or a regulating action is being carried out at the moment by the driver. In this way, the driver is temporarily relieved of the stress of the presentation of new information during such driving situations, in which his concentration is required for other, temporary tasks.

SUMMARY OF THE INVENTION

The driver information device according to the present invention has the advantage that a pause of a predetermined length is inserted between a plurality of items of information outputted to the driver. The pause temporally separates the two items of information that are to be outputted for the driver. This permits the driver to better perceive both the items outputted to him. In particular, the possibility that the driver will mix up the items of information with each other, or that the second item of information will disturb the driver in the processing of the first item of information, is avoided. In particular, a correspondingly predetermined pause makes it possible for the driver to first conclude an action required by the first item of information given to him before the second item of information is outputted. The defining of a predetermined pause means that it is not necessary to evaluate the driver's execution of the action itself. The improved informing of the driver results in an overall reduction of the stress on the driver due to the information provided to him, so that driving safety is increased.

It is particularly advantageous that the length of the pause depends on the content and/or form of the first or second item of information. By taking into account the form of the information, the speed of the driver's sense perception for different sense modalities can be taken into account. In addition, it is possible to take into account the complexity of the content of the information, so that overall a longer pause is provided before and/or after a more complex item of information than for a simple item of information. In particular, it is advantageous that in the case of an item of information that requires the driver to carry out an action, enough time is provided for the driver to execute the action. In addition, it can be ensured that when information having lower priority is outputted, before this information is outputted a sufficient pause is provided so that the low-priority output will not distract the driver in the processing of a previously outputted item of information that may be more important.

In particular, it is advantageous to adapt the length of the pause to a driving situation. If the driver is subjected to a higher level of stress while driving, e.g. in the case of bad weather or when driving at high speed, the pauses between the items of information outputted to the driver can be lengthened in order to reduce overall the stress for the driver in the perception and processing.

In addition, it is advantageous to provide a control unit that enables the driver to vary the length of the pause himself. In this way, a driver who may desire a longer pause between various information outputs can manually lengthen the pause duration, or can shorten it if this is desired.

In addition, it is advantageous to provide a storage unit in which various pause lengths are stored for different information contents or forms of information, or also for different driving situations. In this way, the corresponding pause length can easily be automatically set and subsequently regulated during the trip.

In addition, it is advantageous to provide a warning unit that terminates the pause if an important warning is present. Such information can relate for example to a failure of an important vehicle system, e.g. a failure of the braking system. Such an item of information should be outputted to the driver without delay, independently of any previously outputted items of information.

DETAILED DESCRIPTION

The driver information device according to the present invention can be used in arbitrary vehicles. In the following, it is explained in relation to the example of an application in a motor vehicle.

Figure 1:
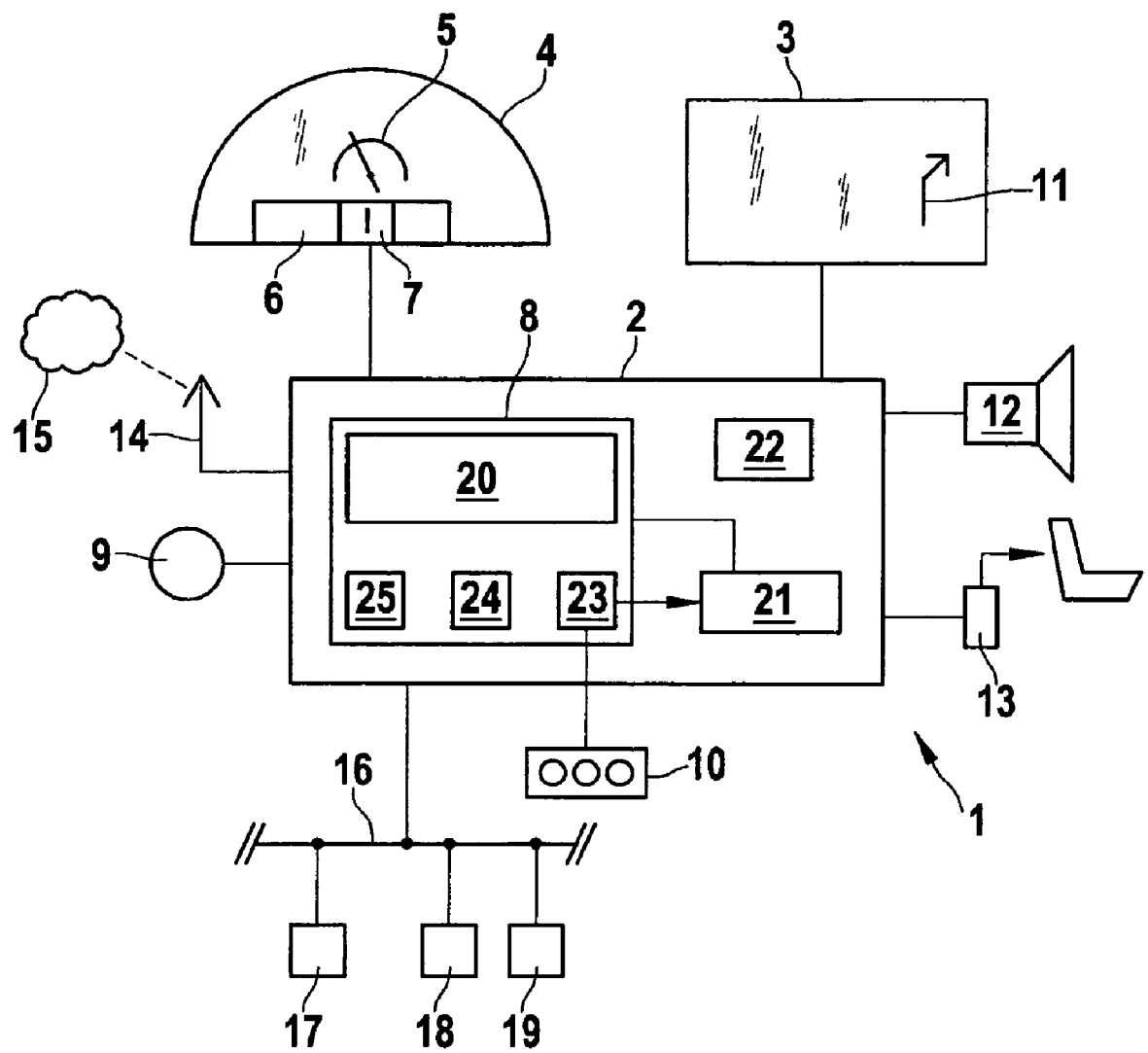
FIG. 1 shows a driver information device according to the present invention.

FIG. 1 shows a driver information device 1 according to the present invention that has a central unit 2. To central unit 2 there is connected a first display 3 that is situated in a center console of the vehicle. Alternatively, or in addition thereto, an instrument cluster 4 is connected to central unit 2 that is situated in front of the driver in the vehicle and that informs the driver, e.g. via a pointer indicator 5, of the current speed of the vehicle. In addition, instrument cluster 4 can also include warning displays 6; in FIG. 1, a display having a warning signal 7 is activated as an example. Driver information device 1 controls displays 3, 4 by communicating information to displays 3, 4. For this purpose, a computing unit 8 is provided in central unit 2.

Driver information device 1 can take over a multiplicity of functions in the vehicle. These can include for example:
a radio function for playing a received radio program, a music reproduction function for playing musical selections stored on a storage unit in a data carrier mechanism 9, a navigation function for outputting driving instructions, e.g. in the form of an arrow representation of 11 in display 3, a warning function for outputting warnings via instrument cluster 4.

For the acoustic output, a loudspeaker 12 is connected to central unit 2. In addition, it is also possible to output a warning haptically. For this purpose, central unit 2 controls a haptic transducer 13 that, during operation, causes a vibration of the steering wheel and/or of the driver's seat. In addition, central unit 2 can also act as a telecommunication unit. For example, central unit 2 can create, via a corresponding interface 14, a radio connection to a data network 15, e.g. a mobile radiotelephone network, outside the vehicle. This connection can take place via an antenna situated on the vehicle or via a radio connection to a communication unit in the vehicle, e.g. using the Bluetooth protocol.

In addition, sensors are connected to central unit 2, preferably via a data bus 16. These can be a speed sensor 17, a rain sensor 18, and/or a radar sensor 19 for monitoring the roadway in front of the vehicle. In addition, driver information device 1 has a operating unit 10 with which driver information device 1 is controlled. Computing unit 8 has in particular a program block 20 that controls the outputting of the various items of information via the various output devices in the vehicle. In this way, it is determined via which output device 3, 4, 12, 13 in the vehicle an item of information is outputted. First, program unit 20 determines that an item of information is to be outputted on at least one of the output devices. By accessing a storage unit 21, program unit 20 determines when this item of information is to be outputted. For this purpose, central unit 2 has a clock circuit 22 that can carry out a time determination. In storage unit 21, the durations of pauses are stored that are to be observed between various information outputs. Program unit 20 takes these pause durations into account during output. In addition, in computing unit 8 a control unit 23 is implemented, preferably as software, that makes it possible for a user to modify the pause durations via operating unit 10. A modification can consist for example in the defining of a factor by which specified pause durations are to be multiplied. A modification is preferably stored in storage unit 21. In addition, an evaluation unit 24 is provided in which, in addition, the driving situation, acquired via sensors 17, 18, 19, or if necessary via additional sensors, is taken into account. The pause duration is adapted dependent on the driving situation. In addition, a warning unit 25 is provided that, in the case in which a warning is to be outputted with a particular level of importance, is able to terminate any pause for the outputting of the particularly important warning, in order to output the warning.

In the following, examples are shown in table form of the various ways of influencing the pause length dependent on the content of an item of information, the form of an item of information, and the driving situation. In a first specific embodiment, these dependencies can be implemented only one at a time. However, it is also possible to combine two, or all, of the dependencies with one another. In a first specific embodiment, in each case the longest pause time indicated in the table is selected. In another specific embodiment, the pause times can also be taken into account in additive fashion, so that the pause times indicated in the tables are added together. In addition, it is also possible that for example the pause times for content and form are added, while, dependent on the driving situation, the resulting sum is multiplied by a corresponding factor. In the following, examples are indicated in which for each item of information a minimum pause before and after the outputting of the information is indicated. If, in the output, one item of information follows another, at least the maximum of the pause time must be observed after the first item of information and before the second item of information. In another specific embodiment, however, these pause times can also be added together.

In the following, the expression "before" indicates the pause length to be observed before the outputting of the information, and the expression "after" indicates the pause duration to be observed after the outputting of the information. Examples of the respective item of information, or of the type of information output or situation, are indicated in parentheses.

1. Dependence on the Content of the Information to be Outputted warning with required driver action: before 0 s, after 5 s
        (takeover request in case of distance-regulated following, stop request e.g. in case of low oil pressure, indication of non-fastened safety belt)

information output without direct driver action: before 1 s, after 3 s (oil state good, information concerning the state of the headlight on-off delay system, indication of cold engine)

driving instruction of the navigation device: before 1 s, after 4 s (e.g. turning instruction)

incoming telephone call: before 5 s, after 1 s

2. Dependence on the Form of the Information to be Outputted display information: before 2 s, after 2 s (e.g. warning symbol in instrument cluster, turn signal in the center console)

acoustic text output: before 1 s, after 3 s (e.g. a turning instruction of the navigation system)

warning tone: before 1 s, after 2 s (e.g. in case of non-fastened safety belt, or too-short distance from an obstacle)

haptic alarm: before 1 s, after 1 s (e.g. steering wheel vibration, seat vibration in case of a lane departure warning)

3. Dependence on the Driving Situation normal driving situation: before 1 s, after 1 s wet roadway: before 2 s, after 2 s (e.g. when windshield wipers are switched on)

high vehicle speed: before 3 s, after 3 s (e.g. if speed is greater than 130 km/h)

If, in a specific embodiment, the driving situation is combined with a dependence on the content and/or on the form of the information to be outputted, the duration of the pause for a normal driving situation can remain unmodified, while the duration of the pause in case of rain can be lengthened by 50%, in case of travel at high speed also by 50%, and in case of high speed travel during rain by 100%, relative to the pause duration resulting from the dependence on content and/or form.

Figure 2:
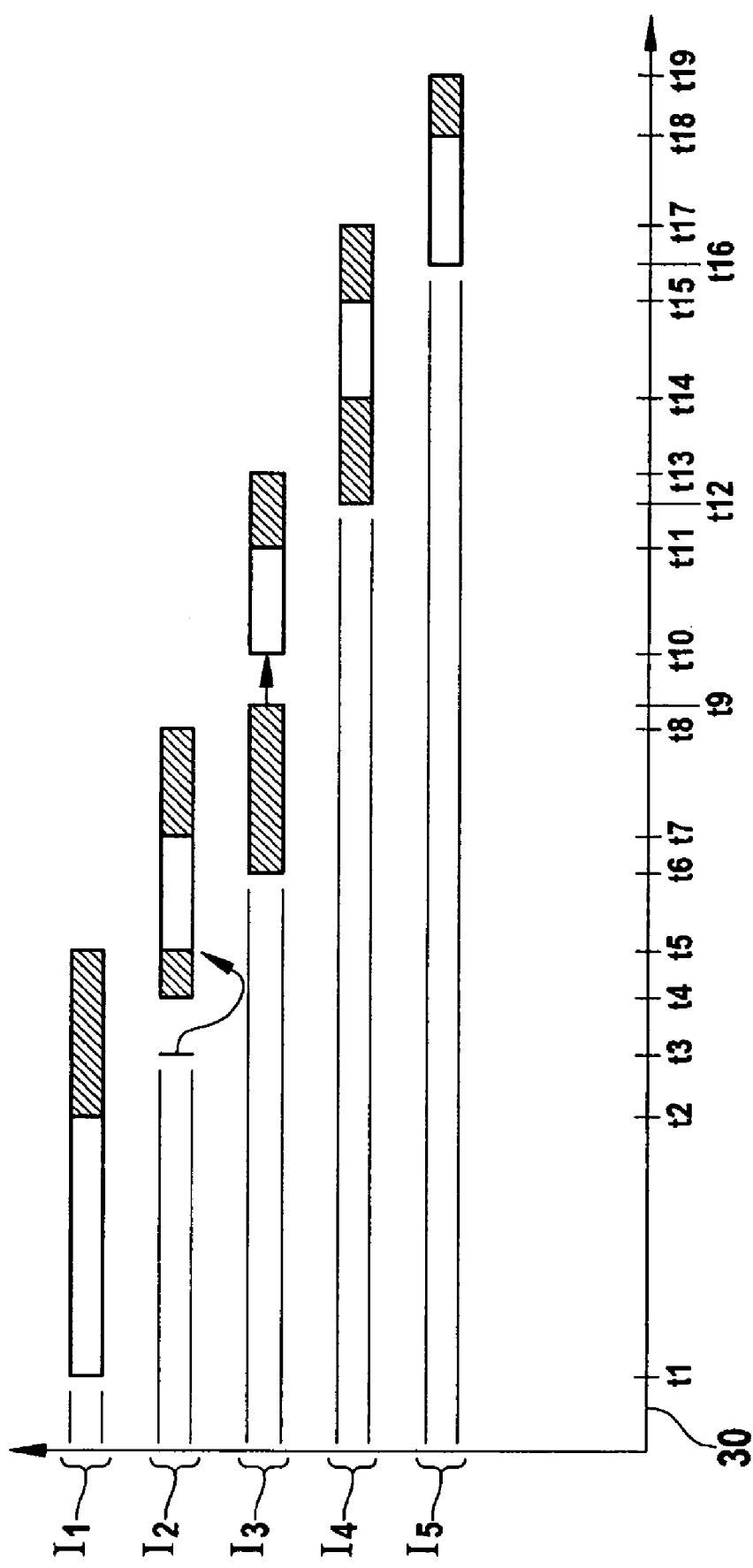
FIG. 2 shows a temporal sequence of an output of warnings according to a method according to the present invention for outputting items of information.

FIG. 2 shows a time flow diagram for different warnings. For this purpose, on x-axis 30 the various time points T1 to T19 are plotted in temporal sequence. On the y-axis, the temporally successive items of information I1 to I5 are plotted. In FIG. 2, a non-hatched bar represents the actual duration of the information outputting. A hatched bar represents the minimum pause time before or after the information output.

The event that triggers item of information I1 occurs at time point T1. Item of information I1 is outputted here without delay. It lasts until time point T2. After item of information I1 is outputted, there is a minimum duration of a pause that lasts up to a time point T5. At time point T3 there occurs an event on the basis of which the outputting of item of information I2 is to be triggered. During the duration of the pause after item of information I1, item of information I2 is at first not outputted. Rather, the beginning of the outputting of the information is shifted to time point T5. Item of information I2 is assigned a minimum pause before the outputting of this information I2. This minimum pause takes up time interval T4 to T5. Because, however, time interval T4 to T5 is shorter than time interval T2 to T5, this minimum duration is unimportant in the exemplary embodiment shown here. The outputting of information I2 lasts until time point T7.

Item of information I1 could for example be a takeover request of a distance-regulated following procedure. Here it is determined that an automatic distance regulation, carried out using a radar sensor, from a vehicle traveling in front can no longer take place due to the low speed of the vehicle in front. In the time interval T2 to T5, the driver now has the opportunity to take over the regulation of the speed of the vehicle himself. Item of information I2 could be a driving instruction, e.g. a turning instruction. Because the turning instruction is to be outputted at the proper time before turning according to time point T3, the slightly later outputting is not disturbing. Rather the driver can now first take over the regulation of the speed of the vehicle, and can subsequently introduce the turning process in a controlled manner in accordance with the driving instruction.

The event that triggers item of information I3 takes place at time point T6. During this time, item of information I2 is still being outputted. After the outputting of item of information I2, there is connected a minimum pause from time point T7 up to a time point T8. However, for the outputting of item of information I3, before the information is outputted a minimum pause is provided from time point T6 to time point T9. This time interval, which is larger than the time interval T7 to T8, follows time point T7, so that item of information I3 is not outputted until time point T10, because with a pause from time point T7 to time point T10 a pause corresponding to the time interval T6 to T9 is also observed. Item of information I3 could for example be an indication of an incoming call.

The outputting of item of information I3 lasts from time point T10 to time point T11. After this there follows a minimum pause duration from time point T11 until time point T13. At time point T14, the event that triggers item of information I4 occurs. Before the outputting of item of information I4, a minimum pause duration from time point T12 to time point T14 is to be observed. However, between time point T11, the end of the outputting of item of information I3, and time point T14, the beginning of the outputting of item of information I4, a pause is observed that is both greater than time interval T11 to T13 and greater than time interval T12 to T14. Therefore, item of information I4 is outputted already at time point T14. A delay does not take place here.

Item of information T14, e.g. an indication that refueling will soon be required, is outputted until time point T15. At time point T16, the event that triggers item of information I5 occurs. Item of information I5 relates for example to a required immediate stopping of the vehicle, e.g. to a technical defect, for example a failure of the generator or a disturbance of the airbag system. This item of information should be outputted to the driver immediately. A corresponding authorization is assigned to item of information I5. It is true that time point T16 is still located in the specified pause interval between time points T15 and T17, following the output of item of information I4, but the pause is interrupted by the outputting of item of information I5. Item of information I5 is outputted from time point T16 until time point T18, and a pause follows up until time point T19.

At the indicated time point of the event that triggers an item of information, for simplified representation it is assumed, ignoring computational processing times, that the event is processed immediately after it occurs, and the outputting of the information is immediately available. The time of the event designates the time point from which in principle an outputting of information would be possible.

What is claimed is:

1. A driver information device comprising:
   an output unit for outputting items of information, a pause of a predetermined length being inserted between consecutive outputting of a first item of information and a second subsequent item of information;
   wherein the length of the pause between the consecutive outputting of the first and second items of information is adjusted depending on at least one of a content and a form of at least one of the first and second items of information.

2. The driver information device according to claim 1, further comprising an evaluation unit for adapting the length of the pause to a driving situation.

3. The driver information device according to claim 1, further comprising a control unit for user influencing of the length of the pause.

4. The driver information device according to claim 1, further comprising a storage unit for storing pause lengths for at least one of (a) various contents of items of information that are to be outputted, (b) forms of items of information that are to be outputted, and (c) driving situations.

5. The driver information device according to claim 1, further comprising a warning unit for terminating the predetermined pause when there is a warning to be outputted, the warning being assigned an authorization for a termination of the pause.

6. A method for outputting items of information in a vehicle, comprising:
   consecutively outputting a first item of information and a second subsequent item of information; and
   inserting a pause having a predetermined length between the consecutive outputting of the first item of information and the second item of information;
   wherein the length of the pause between the consecutive outputting of the first and second items of information is adjusted depending on at least one of a content and a form of at least one of the first and second items of information.

7. The method according to claim 6, wherein the length of the pause is adjusted dependent on a driving situation.

8. A driver information device comprising:
   an output unit for outputting items of information, a pause of a predetermined length being inserted between consecutive outputting of a first item of information and a second subsequent item of information; and
   a storage unit for storing a plurality of different pause lengths, wherein the length of the pause inserted between the consecutive outputting of the first and second items of information is selected from the plurality of different pause lengths, depending on at least one of (a) various contents of items of information that are to be outputted, (b) forms of items of information that are to be outputted, and (c) driving situations.

* * * * *